United States Patent
Pulle et al.

(10) Patent No.: US 12,292,816 B2
(45) Date of Patent: May 6, 2025

(54) SYSTEM, METHOD, AND GRAPHICAL USER INTERFACE FOR TEMPORAL PRESENTATION AND NAVIGATION OF CODE PATH DATA

(71) Applicant: Salesforce, Inc., San Francisco, CA (US)

(72) Inventors: Ravi Sankar Pulle, Fremont, CA (US); Ajay Krishna Borra, San Jose, CA (US); Eric Gross, Oakland, CA (US)

(73) Assignee: Salesforce, Inc., San Francisco, CA (US)

(*) Notice: Subject to any disclaimer, the term of this patent is extended or adjusted under 35 U.S.C. 154(b) by 116 days.

(21) Appl. No.: 18/068,490

(22) Filed: Dec. 19, 2022

(65) Prior Publication Data

US 2024/0202100 A1    Jun. 20, 2024

(51) Int. Cl.
| | |
|---|---|
| *G06F 11/36* | (2025.01) |
| *G06F 9/451* | (2018.01) |
| *G06F 11/362* | (2025.01) |
| *G06F 11/3698* | (2025.01) |

(52) U.S. Cl.
CPC .......... *G06F 11/3636* (2013.01); *G06F 9/451* (2018.02); *G06F 11/3698* (2025.01)

(58) Field of Classification Search
CPC .. G06F 11/3636; G06F 9/451; G06F 11/3664; G06F 8/75; G06F 21/563; G06F 9/3005; G06F 8/433; G06F 9/30058; G06F 16/9024; G06F 11/3409; G06F 9/5016; G06F 9/5027
See application file for complete search history.

(56) References Cited

U.S. PATENT DOCUMENTS

| | | |
|---|---|---|
| 10,614,362 B2 | 4/2020 | Borra et al. |
| 10,936,308 B2 | 3/2021 | Borra et al. |
| 10,979,424 B2 | 4/2021 | Surendran et al. |

(Continued)

FOREIGN PATENT DOCUMENTS

CN    113934475 A  *  1/2022

OTHER PUBLICATIONS

Translated CN 113934475 A; 42 pages (Year: 2022).*

(Continued)

*Primary Examiner* — S. Sough
*Assistant Examiner* — Cuong V Luu
(74) *Attorney, Agent, or Firm* — Nicholson De Vos Webster & Elliott LLP

(57) ABSTRACT

Apparatus, method, and graphical user interface (GUI) for presentation and navigation of code path data. Code path data samples, including temporal data, related to a plurality of code paths of program code are used to render an interactive GUI including a set of graphical elements representing a corresponding set of code paths. Each graphical element indicates resource utilization changes associated with a respective code path over a time period. The set of graphical elements are visually arranged in a first dimension and the period of time is indicated in a second dimension. Different techniques are used to represent resource utilization over time including extending the graphical elements in a third dimension or changing a width of the graphical elements within a plane defined by the first dimension and the second dimension.

24 Claims, 10 Drawing Sheets

(56) References Cited

U.S. PATENT DOCUMENTS

| | | |
|---|---|---|
| 11,270,210 B2 | 3/2022 | Borra et al. |
| 11,327,952 B2 | 5/2022 | Borra et al. |
| 11,531,554 B2 | 12/2022 | Borra et al. |
| 2007/0288908 A1 | 12/2007 | Cain et al. |
| 2008/0168427 A1 | 7/2008 | Bestgen et al. |
| 2013/0218506 A1 | 8/2013 | Zinzilieta et al. |
| 2019/0220314 A1 | 7/2019 | Borra et al. |
| 2019/0332376 A1 | 10/2019 | Borra et al. |
| 2020/0106770 A1 | 4/2020 | Surendran et al. |
| 2020/0226156 A1 | 7/2020 | Borra et al. |
| 2020/0274894 A1 | 8/2020 | Argoeti et al. |
| 2020/0326918 A1 | 10/2020 | Venka et al. |
| 2021/0173670 A1 | 6/2021 | Borra et al. |
| 2022/0121560 A1* | 4/2022 | Tetreault ............ G06F 11/3664 |
| 2022/0413992 A1* | 12/2022 | Nguyen ............ G06F 11/3428 |
| 2023/0153226 A1* | 5/2023 | Garg .................. G06F 11/3624 |
| | | 717/128 |

OTHER PUBLICATIONS

András Kovács et al.; Vectorisation of Program Codes for Machine Learning Based Resource Estimation; IEEE; pp. 135-140; retrieved on Dec. 31, 2024 (Year: 2023).*

Non-Final Office Action, U.S. Appl. No. 18/068,487, Dec. 27, 2023, 6 pages.

Notice of Allowance, U.S. Appl. No. 18/068,487, Apr. 15, 2024, 8 pages.

Notice of Allowance, U.S. Appl. No. 18/068,487, Jul. 31, 2024, 5 pages.

* cited by examiner

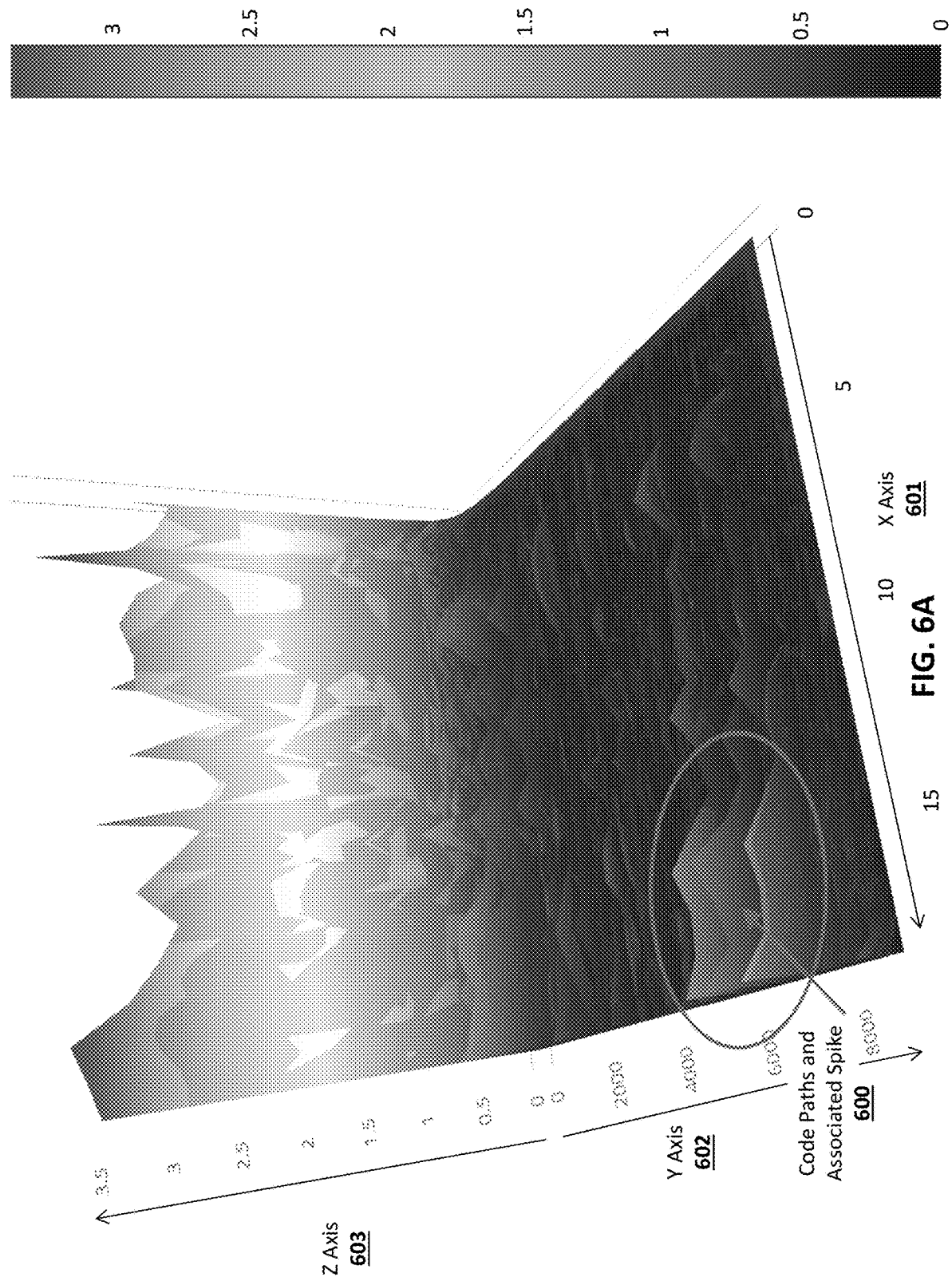

SYSTEM, METHOD, AND GRAPHICAL USER INTERFACE FOR TEMPORAL PRESENTATION AND NAVIGATION OF CODE PATH DATA

TECHNICAL FIELD

One or more implementations relate to the field of computer systems for managing services; and more specifically, to a system, method, and GUI for temporal presentation and navigation of code path data.

BACKGROUND ART

Stack tracing is a technique for monitoring called functions of code paths within a thread or application. Metrics are collected by sampling timestamps which indicate the start time and end time of each function called within a particular code path. For larger applications with potentially thousands of threads and hundreds of thousands of code paths, sampling is performed to capture the timing data from various code paths are regular intervals. This timing data may be used to identify those code paths and/or functions which are causing resource utilization problems such as processor utilization spikes.

In current implementations, however, identifying the specific code paths which are responsible for resource utilization spikes can be challenging, particularly for implementations with a large number of active threads. For example, in a complex application with a large number of code paths it becomes difficult to isolate those code paths which are the primary contributors to a resource spike event. Running a CPU profile during the spike event will not pinpoint the root cause code paths unless it can be compared to a baseline window; however a baseline window is not consistent in a production environment when an application can have a vast number of features and code paths.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 6A-B illustrate one implementation of a graphical user interface for visualizing code paths with a time dimension;

DETAILED DESCRIPTION

Figure 1:
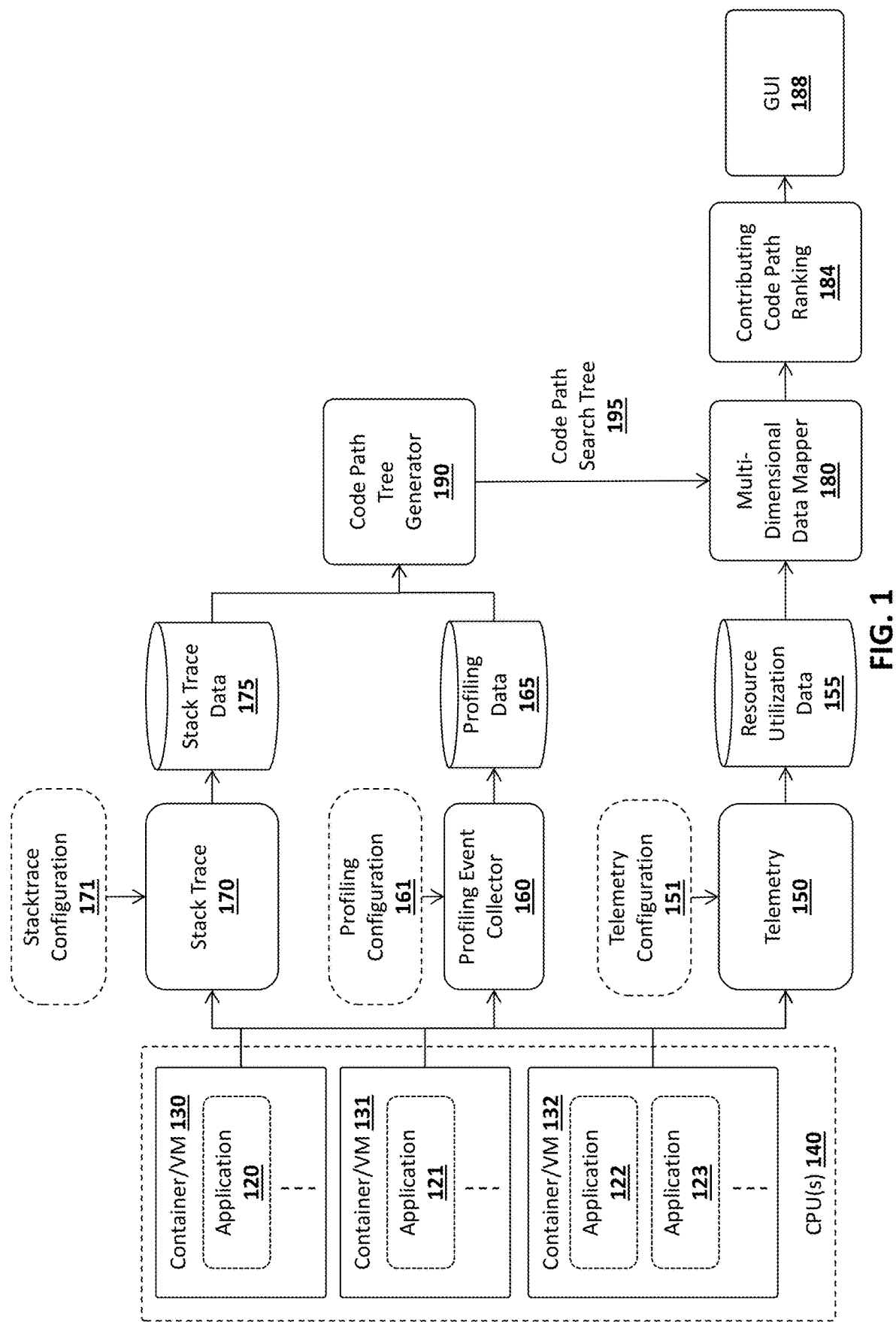
FIG. 1 illustrates one implementation of a system identifying code paths responsible for resource utilization spikes.

Implementations of the invention collect, filter, and analyze stack tracing and code profiling data in view of resource utilization data to identify one or more code paths responsible for over-utilization of system resources. Resource utilization refers to a measured value or set of measured values which reflect the portion of the total capacity of a resource being used. For example, an 80% CPU utilization means that 80% of the total capacity of the CPU is being utilized, leaving 20% available for performing additional work. While some implementations below focus specifically on CPU utilization, other types of system resources may be monitored and analyzed using the techniques described herein, including memory storage utilization, memory bandwidth utilization, and input/output (IO) utilization.

In some implementations, stack tracing is performed to collect code path samples of a container, virtual machine (VM), and/or application at runtime. Each stack tracing sample includes one or more timestamps indicating the start and end times of the function calls within the sampled code path. Profiling data related to the execution environment is also sampled and associated with the stack tracing samples (e.g., via thread identifiers). During the same periods of time, resource utilization is tracked and corresponding resource utilization samples are stored, including samples related to resource utilization spikes.

In one implementation, the stack tracing data and associated profiling data is processed and stored in a search tree structure to provide a more efficient and manageable representation. The data from the search tree structure is then aligned and mapped to corresponding resource utilization data for analysis. For example, correlations are identified between code paths in the search tree structure and occurrences of resource utilization spikes.

In one implementation, multi-level filtering is performed to remove code paths from consideration which are unlikely to be the cause of the resource utilization spikes. For example, code paths which are not increasing in frequency during the relevant time period and code paths executed below a threshold frequency may be filtered and thereby removed from consideration.

Following the filtering operations, a subset of the remaining code paths are identified (e.g., 10, 15, etc) as contributing to the resource utilization spike based, for example, on the frequency with which these code paths are executed during windows of time when the resource utilization spikes are detected. The execution of these contributing code paths may be further evaluated in view of the resource utilization data to identify further correlations.

In one implementation, a correlation score or ranking value may be determined for each contributing code path, indicating the extent to which execution of the contributing code path correlates with the resource utilization spikes (and therefore the relative likelihood that the code path is responsible, at least in part, for the resource utilization spikes). In general, code paths assigned relatively higher scores are more likely contributing to the occurrences of the processor utilization spikes than code paths assigned relatively lower scores.

Once a set of code paths are identified via correlation scores, proactive measures may then be taken to remediate the problem, such as notifying the team or other entity responsible for designing and maintaining the program code and/or throttling compute resource utilization by the code paths.

FIG. 1 illustrates one implementation in which a plurality of containers/VMs 130-132 and associated applications 120-123 are executed on one or more CPUs 140. Stack trace logic 170 traces execution of various code paths within the containers/VMs 130-132 and/or associated applications 120-123, as specified by a current stack trace configuration 171. Although illustrated external to the containers/VMs, at least some of the stack trace logic 170 may be operated within the containers/VMs/applications (e.g., as instrumented program code within the containers/VMs 130-132 and/or applications 120-123).

The stack trace configuration 171 may indicate certain types of code paths, events, or other conditions, for which stack trace data 175 is to be collected. In one implementation, the stack trace data 175 includes timing data (e.g., timestamps) associated with function call stacks of the containers/VMs 130-132, applications 120-123, and/or other software entities (e.g., as specified by the stack trace configuration 171). For example, start and end timestamps may be collected for sequences of function calls associated with each active thread of the containers/VMs 130132 and/or applications 120-123. The function call timing data for each active thread may be associated with the corresponding thread identifier (ID).

In one implementation, a profiling event collector 160 samples profile data 165 related to the runtime environment of the containers/VMs 130-132 and associated applications 120-123 over the relevant time intervals. The profile data 165 provides contextual information related to the stack trace data 175 such as the set of objects running in the virtual machine/container 130-132, runtime variables, the set of classes being recompiled, memory usage statistics, and garbage collection metrics. The profiling configuration 161 indicates the frequency at which the profile data 165 is collected and/or the specific types of profile data to be collected and associated with the stack trace data 175. In one particular implementation, the profiling event collector 160 is an instance of a Java Flight Recorder (JFR), which collects profiling data related to both the containers/VMs 130-132 and the associated applications 120-123.

In one implementation, telemetry logic 150 collects various forms of resource utilization data 155 including, but not limited to, CPU utilization data. In one embodiment, the resource utilization data 155 is collected over specified intervals of time, in accordance with the telemetry configuration 151. For example, telemetry logic 150 may sample various performance monitoring counters of the CPUs 140 to determine the utilization metrics for those CPUs at a frequency indicated by the telemetry configuration 151.

In one implementation, a code path tree generator 190 constructs a search tree using relevant portions of the profiling data 165 and the stack trace data 175, associating portions of the stack trace data 175 with portions of the profiling data 165 based on thread ID (e.g., grouping data based on corresponding thread IDs). In one implementation, the data in the code path search tree 195, sometimes referred to herein as "code path" data, is used for performing the correlation with the CPU utilization data 155 to identify code paths which are the cause of CPU spikes.

In one implementation, the code path tree generator 190 generates a code path search tree 195 comprising a compressed representation of the stack trace data 175 and profile data 165. For example, the raw stack trace data 175 may comprise a sequential listing of all function calls and associated timestamps over windows of time. To provide a more efficient and manageable representation, the code path tree generator 190 constructs a code path search tree 195 which removes redundancies by combining multiple instances of each code path within the searchable tree structure, and tracking the number of instances of each code path and associated timing data within one or more of the nodes of the search tree 195.

Different implementations may use different types of searchable tree structures. For example, a trie (or "prefix tree") is a search tree data structure that stores (key, value) pairs. Each key is the path to a value that is stored in a leaf node. A radix trie is a data structure that represents a space-optimized trie in which each node that is the only child is merged with its parent. As another example, a Radix Trie of Radix two (or "Patricia trie") is a special variant of the radix two (binary) trie, in which rather than explicitly storing every bit of every key, the nodes store only the position of the first bit, which differentiates two sub-trees. Finally, a hash tree or Merkle tree may be used in which every leaf node is labelled with the cryptographic hash of a data block, and every node that is not a leaf (inner node, or inode) is labelled with the cryptographic hash of the labels of its child nodes.

In some implementations, the Merkle tree hash techniques may be combined with a trie (Merkle trie), radix trie (Merkle radix trie), or radix trie of radix two (Merkle radix trie of radix two). For example, in a Merkle trie, each key is a hash of its corresponding value. The root of merkle trie is a list of these (hash, value) pairs. Another hash function is applied on these pairs to get a hash of the root to represent the entire tree. A merkle trie allows for partial matches (i.e., matching one key/value pair at a time) where a standard merkle tree only allows for matching with the entire tree. A Merkle radix trie operates similarly to the Merkle trie, but the trie is the space-optimized trie in which each node that is the only child is merged with its parent. Finally, a Merkle radix trie of radix two adds complexity to the data structure in that there are 4 types of nodes: (1) Null (represented as the empty string); (2) branch A 17-item node [v0 . . . v15, vt]; (3) leaf A 2-item node [encodedPath, value]; and (4) extension A 2-item node [encodedPath, key].

In one implementation, when constructing the code path search tree 195, the code path tree generator 190 attempts to strike a balance between size and query performance. Given that the stack trace data 175 typically includes code paths that can split at any point and diverge into multiple paths, the code path tree generator 190 generates path junction nodes representing these divergent paths and duplicate string values observed at the path junction nodes (e.g., combining multiple paths leading up to the node into a single path). In this implementation, multiple unique paths can start from a single node and each unique path occurrence is a stack trace sample collected at a specific time. Various types of custom events may span different windows of time.

In one specific implementation, the code path tree generator 190 hashes node values in the code path search tree 195 and does not store individual strings at each node. Node counts are maintained and a trie (or prefix tree) is used rather than storing individual paths. Unique stack trace IDs may be indexed with trie nodes. In addition, start and end nodes of the trie structure are indexed with unique stack trace IDs to identify and query the code path search tree 195 (e.g., when determining unique paths). In one implementation, sorted arrays are used to both preserve custom event records and to preserve a unique stack trace event timeline for each thread.

A store and indexing algorithm specified in the following code sequence combines the above features to optimize size and query performance of the stack trace data:

```
HotspotBlob{
  Node trie;                                    // structure to hold paths
  Long start;                                   // stacktrace sample start time
  Long end;                                     // stacktrace sample end time
  Map<Integer, String> nodevalueMap;                       //node value
  hash to
                                                   value
  Map<Integer, List<StackidTime>> tidMap;              //tid and stacktrace
                                                   sample timeline
  Map<Integer, List<CustoEvent>> custoevents;          //map of pid and list
  of
                                                   custom events
}
Node{
  int hash;                                        //node value hash
  int sz = 0;                                      //node occurrence size
  int sf = 0;                                      //did the path end at this
  node?
  List<Node> nodes;                                // structure to hold paths
  Map<Integer, Integer> sm;                   // index to unique stacktrace, denote start
                                                 and end of path
}
StackidTime {
  Integer hash;
  Integer time;
}
TidTime {
  Integer tid;
  Integer time;
}
```

Regardless of which data structure is used, the multi-dimensional data mapper 180 aligns the data from the code path search tree 195 with the utilization data 155 to ensure that the relevant sets of code path data are mapped to the corresponding sets of utilization data 155. As described in greater detail below, given the cause and effect relationship between the execution of contributing code paths and measurements of the utilization spike, the timing values associated with the two sets of data may be offset. In one implementation, the multi-dimensional data mapper 180 detects the size of this offset and uses it to align the relevant code path data with the resource utilization data 155.

Contributing code path ranking logic 184 analyzes the code path data in view of the mapped utilization data 155 to identify code paths which are the most significant contributors to the utilization spikes. In one implementation, based on the analysis, each contributing code path is assigned a ranking based on its contribution to the utilization spikes relative to other contributing code paths. The contributing code path rankings and associated stack trace data and profiling data may be displayed for a user within a graphical user interface visualization tool 188, examples of which are provided below.

Figure 2:
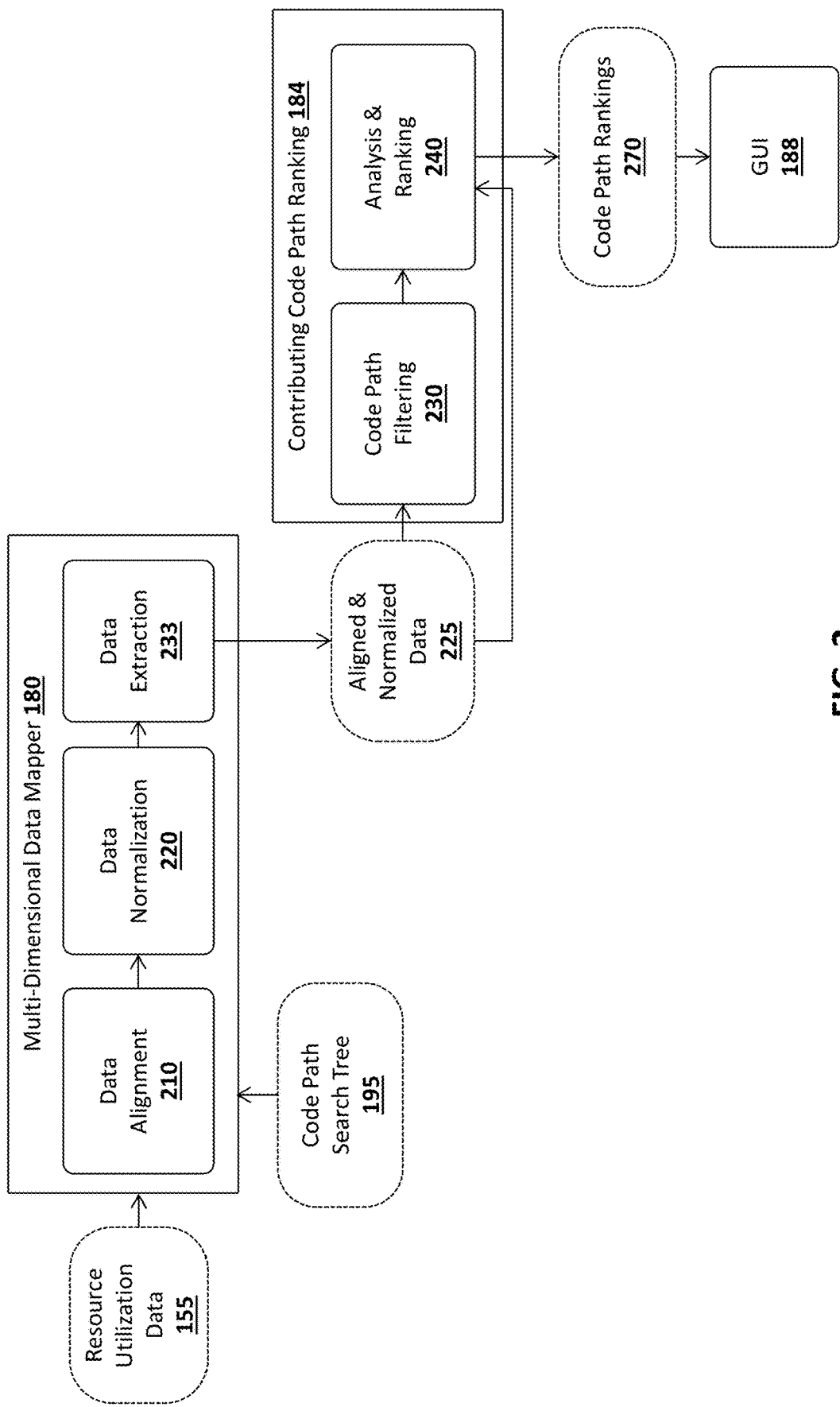
FIG. 2 illustrates one implementation in which stack tracing data is mapped to resource utilization data.

FIG. 2 illustrates one implementation of the multi-dimensional data mapper 180 which aligns the data collected from various sources and the contributing code path ranking logic 184 which analyzes and ranks the contributing code paths. As mentioned, the timing of the utilization data 155 may be offset from the timestamps in the code path search tree 195. For example, there may be a delay between the time a given code path is executed and the time at which the impact of the code path execution is measured in the utilization data 155.

In one implementation, to address this issue, data alignment logic 210 aligns the data from the code path search tree 195 with the utilization data 155. In one implementation, the data alignment logic 210 evaluates the utilization data 155 and the data from the code path search tree 195 over a period of time (e.g., several minutes, hours, etc) to identify patterns or correlations between the two sets of data. For example, changes in the data from the code path search tree 195 over time, such as the frequency at which code paths are executed, should be reflected in the changes in the resource utilization data 155 over time.

Figure 3:
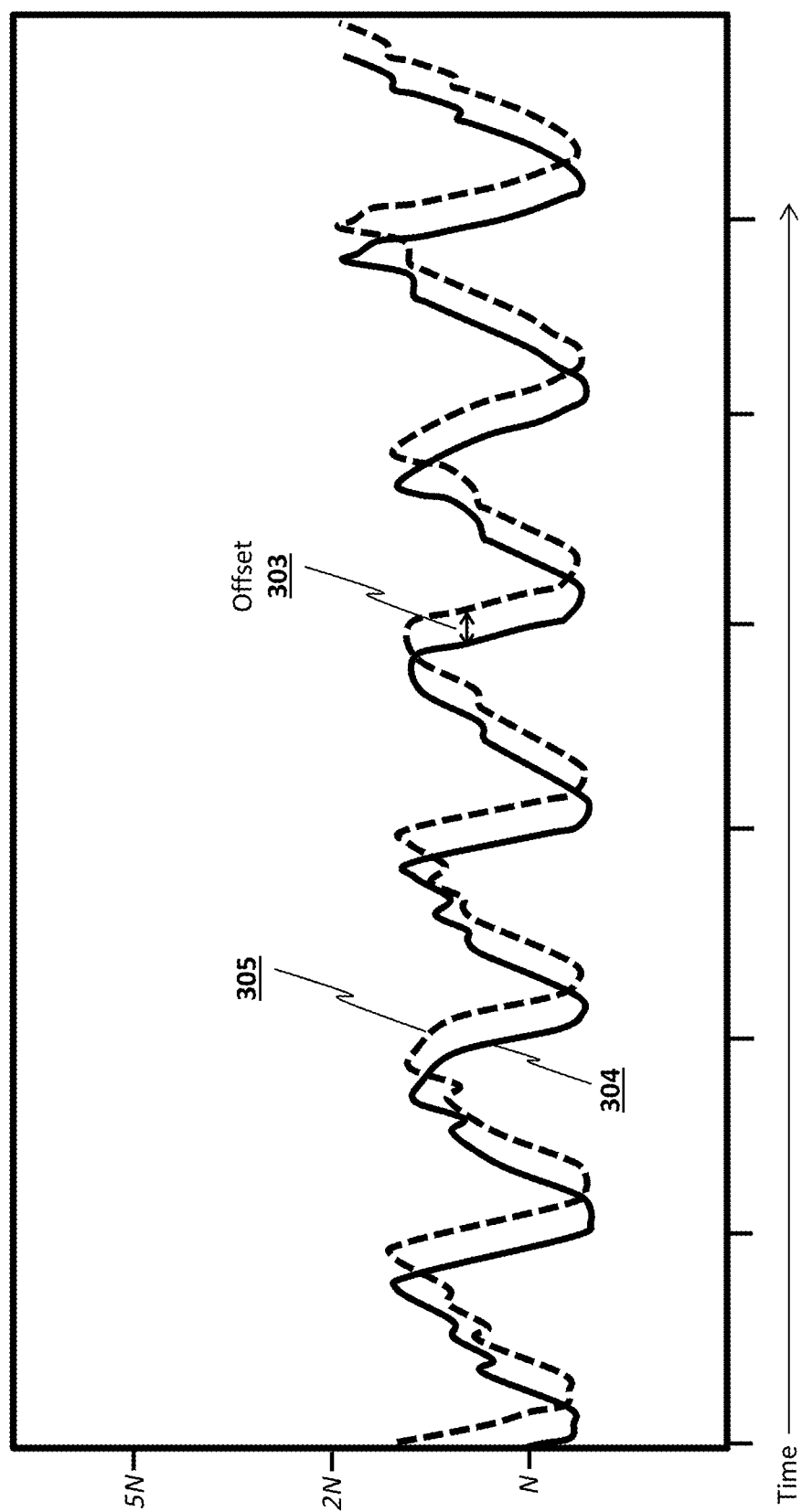
FIG. 3 illustrates an example in which an offset is determined between stack tracing curve and a resource utilization curve.

FIG. 3 illustrates an example of resource utilization 305 and normalized code path execution data 304 (e.g., based on the number of executing code paths) plotted on a common timeline. In one implementation, the data alignment logic detects the correlation between the rising and falling edges of the code path execution data 304 and the resource utilization 305 to identify an offset 303 between the two sets of data. It then adds the offset 303 to the code path data timestamps or subtracts the offset 303 from the resource utilization timestamps to align the two sets of data in time.

In addition, different code paths and different profiling data within the code path search tree 195 may not have synchronized timestamps (e.g., as a result of being executed in different execution environments). In one implementation, the data alignment logic 210 performs a similar analysis to identify one or more offsets and use the offsets to align all code paths and profiling data to a common timeline. For example, timing offsets may be determined by evaluating the code path data and corresponding profiling data to determine the correct timing between these two sets of data. The offset may then be applied to adjust the timestamps associated with one or more code paths and profiling data to ensure that the code path and profiling timing is properly aligned.

Data normalization logic 220 normalizes the data from the code path search tree 195 so that it can be evaluated in view of the resource utilization data 155. For example, a normalized range may be defined by specifying minimum and maximum values within a normalized range (e.g., 0 to 100) and the individual data values from the code path search tree 195 may be scaled and mapped to the normalized range. Any "outlier" data points (e.g., those far above the next largest value) may be removed or set to the maximum defined value in the normalized range. Normalization to within a defined range in this manner simplifies the analysis of the code path data in view of the resource utilization data 155.

Data extraction logic 233 then extracts relevant portions of the aligned, normalized code path data and profiling data, as well as relevant portions of the resource utilization data 155. The resulting aligned and normalized data 225 is analyzed by the code path ranking logic 184 to identify and rank code paths contributing to resource utilization spikes. In some implementations, the search tree 195 is updated with the aligned and normalized data 225, or a new search tree is generated using the aligned and normalized data 225.

Figure 4:
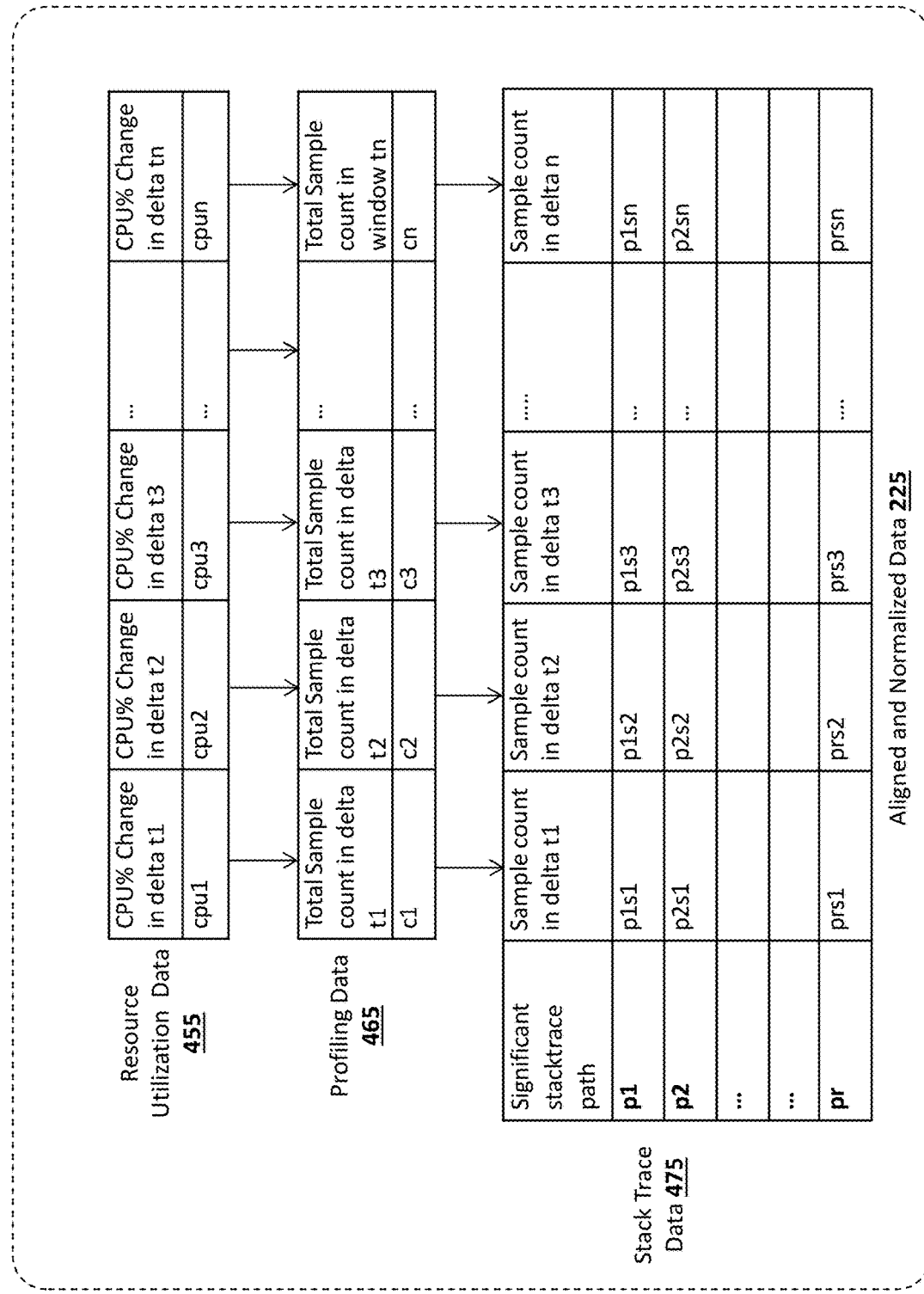
FIG. 4 illustrates an example of temporally aligned data related to resource utilization, profiling, and stack tracing.

FIG. 4 illustrates an example of a set of aligned and normalized data 225 produced by the multi-dimensional data mapper 180, including resource utilization data 455, profiling data 465 and stack trace data 475 arranged in a set of tables. In one implementation, the multi-dimensional data mapper 180 scans the code path search tree 195 to identify all significant code paths and sample counts, and extracts this data to build the tables containing the profiling data 465 and stack trace data 375. It chooses a window size into which to subdivide the extracted data (e.g. 30 seconds, 1 minute, 4 minutes, etc), and constructs the tables based on this window size.

Within the set of tables, each column is associated with an aligned time delta or window (t1, t2, t3, . . . tn). Thus, the first column of each table stores data associated with time period t1, the second column stores data associated with time period t2, and so on, up to tn. The resource utilization data 455 comprises the change in CPU utilization over each associated time period. A particular CPU utilization change indicated in a particular column for a given time delta is associated with the portion of the profiling data 465 and stack trace data 475 in the corresponding column. Consequently, if the CPU utilization data 455 in a particular column indicates a utilization spike, then the corresponding profiling data 465 and/or stack trace data 475 in a corresponding column can be evaluated to identify contributing code paths. Multiple time periods in which a utilization spike occurs can be evaluated in combination with time periods in which no utilization spike occurs to determine correlations between the utilization spikes and certain code paths. In general, the profiling data 465 and/or stack trace data 475 associated with multiple corresponding utilization spikes will indicate one or more code paths which are contributing to the utilization spikes.

In one implementation, the contributing code path ranking logic 184 performs this analysis using the temporally-aligned resource utilization data 455, profiling data 465 and stack trace data 475 to identify a set of contributing code paths. For example, if a particular set of code paths are always observed within the same time window as each utilization spike, then this set of code paths may be considered contributing code paths (i.e., code paths contributing to the utilization spike), and may be evaluated further to identify the potential causes of the utilization spikes.

Referring again to FIG. 2, in one implementation, code path filtering logic 230 removes code paths from consideration which are not contributing to the utilization spikes. For example, within the time windows of the resource utilization spikes, any code paths which are not increasing within the same time window or which have sample counts below a threshold number may be filtered out, as they are clearly not responsible for the utilization spikes. Various other types of stack trace data 475 and/or profiling data 465 may be filtered if the data indicates a lack of correspondence with the resource utilization spikes. Filtering is highly beneficial in this implementation because thousands of threads may be running at the same time. These may be filtered down to a manageable number of candidates (e.g., 10-20) which show a correlation to the resource utilization metrics (e.g., have the highest sample counts during the relevant periods of time).

Analysis and ranking logic 240 then performs the analysis on the filtered set of temporally-aligned stack trace data 475 and profiling data 465 in view of the corresponding resource utilization data 455 to identify code paths which are the most significant contributors to the utilization spikes. The analysis and ranking logic 240 may perform a statistical analysis to detect the correlation and assign a ranking value (e.g., using a Pearson correlation, Kendall rank correlation, Spearman correlation, Point-Biserial correlation, etc). Alternatively, or in addition, machine learning may be used to observe and learn the behavior of the stack traces over an extended period of time. Once the learning stage has been performed, the machine learning engine of the analysis and ranking logic 240 can identify and rank the contributing code paths with greater precision. Various other or additional combinations of techniques may be used to determine the ranking value including, but not limited to, combinations including similarity learning, generative models, clustering models, and genetic algorithms.

Regardless of the specific algorithm used, the analysis and ranking logic 240 ranks each code path based on the analysis, to produce a set of ranked code paths 270, which may comprise a set of the N highest ranked code paths (i.e., the code paths most likely to be contributing to the resource utilization spike). The contributing code path rankings and associated stack trace data and profiling data may be displayed within a graphical user interface visualization tool 188, to provide for further analysis and potential remediation actions.

Figure 5:
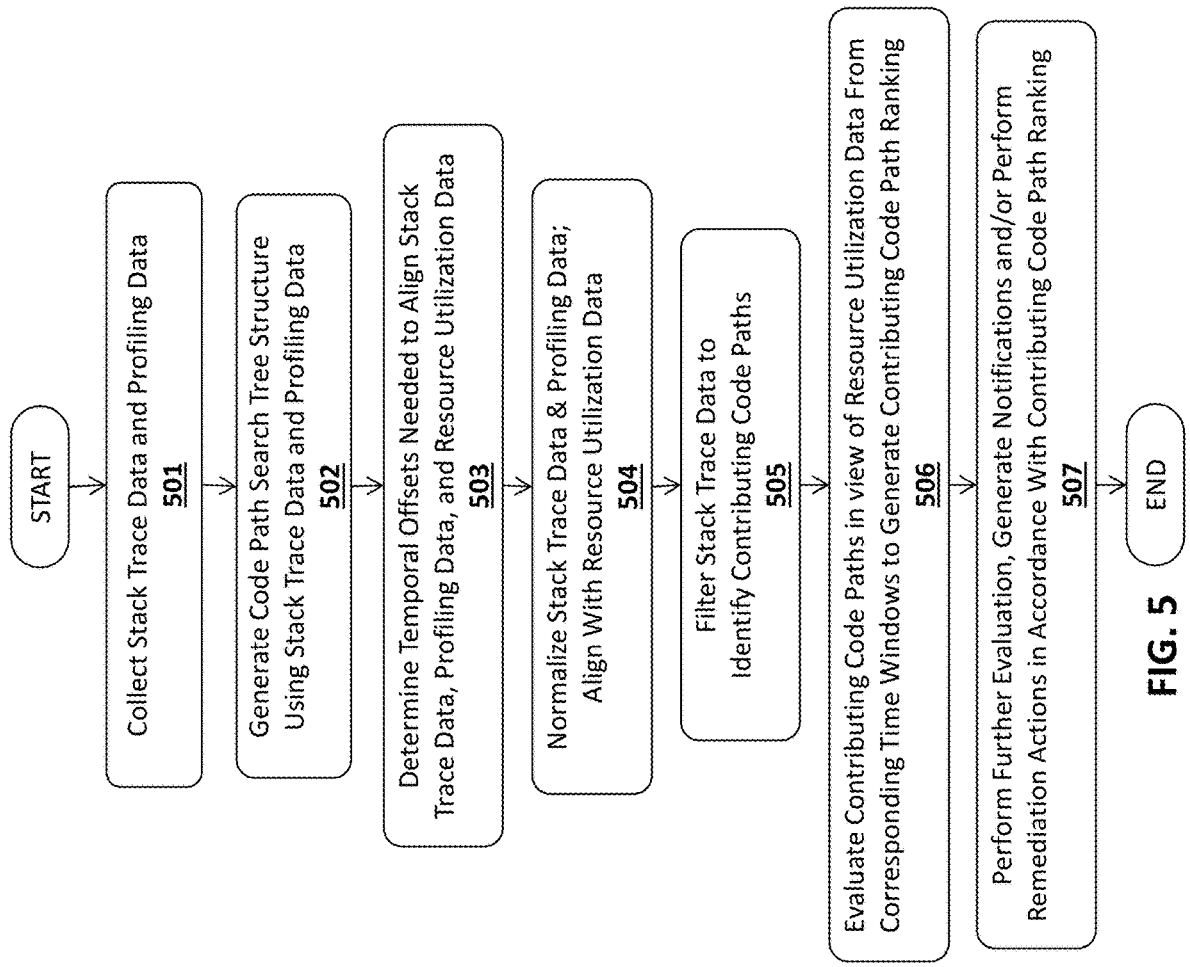
FIG. 5 illustrates one implementation of a method for collecting data and identifying code paths contributing to a resource utilization spike.

A method in accordance with one implementation is illustrated in FIG. 5. The method may be implemented on one or more of the architectures described herein, but is not necessarily limited to a particular architecture.

At 501, stack trace data and profiling data are collected from a set of containers/VMs and/or applications. At 502, a code path search tree structure is generated using the stack trace data and profiling data (e.g., using one or more of the tree structures described herein). At 503, temporal offsets are determined for aligning the stack trace data, profiling data, and resource utilization data. As mentioned, the temporal offsets may be determined by correlating patterns in the resource utilization data with patterns in the stack trace data and profiling data.

At 504, the stack trace data and profiling data are normalized (e.g., based on a normalized range of values including minimum and maximum values) and aligned with the resource utilization data (e.g., using the determined temporal offsets).

At 505, portions of the stack trace data are filtered out from consideration based on lack of a correlation between the corresponding code paths and the resource utilization data. This may include, for example, code paths which are decreasing in frequency or which have a frequency below a threshold during the resource utilization spike windows.

At 506, the contributing code paths are evaluated in view of resource utilization data from corresponding time windows to generate ranking values for at least a portion of the contributing code paths, based on how closely the code paths correlate to the resource utilization spikes. Various techniques may be used to determine the correlation including a statistical analysis and machine learning. As mentioned, a higher ranking value indicates a larger correlation between the corresponding code path and the resource utilization data (including the resource utilization spikes).

Art 507, the highest ranked code paths may be further evaluated to attempt to identify the reason for the elevated resource utilization. In addition, notifications may be generated and sent to the owner of the source code corresponding to the code paths so that they can evaluate the problem. In some instances, remediation actions may also be taken in accordance with the ranking. For example, resource utilization for program code associated with the code paths may be throttled.

In existing implementations, stack trace data is visualized using aggregated call tree, backtrace tree, and/or flame graphs for a given time window. This visualization, however, does not include a timeline of stack trace changes to determine which specific code paths are contributing to a CPU or memory spike at a given time.

Some implementations include a graphical user interface (GUI) 188 for efficiently representing the "significance" of each code path (e.g., the resource utilization of each code path) for a large number of code paths over a period of time. In these implementations, the stack trace data is split into smaller windows or deltas of time, and the significance of each code path is measured for each of these time deltas (e.g., based on the frequency with which each code path is observed). In FIG. 4, for example, the stack trace data 475 is subdivided into a sequence of time deltas (t1, t2, t3, . . . tn). For a given significant stack trace path, a separate sample count is provided for each time delta, indicating the significance of this stack trace within the time delta. The stack trace data 475 may be aligned with the resource utilization data 455 and profiling data 465 and normalized as described above, prior to being visualized within the GUI.

Figure 6B:
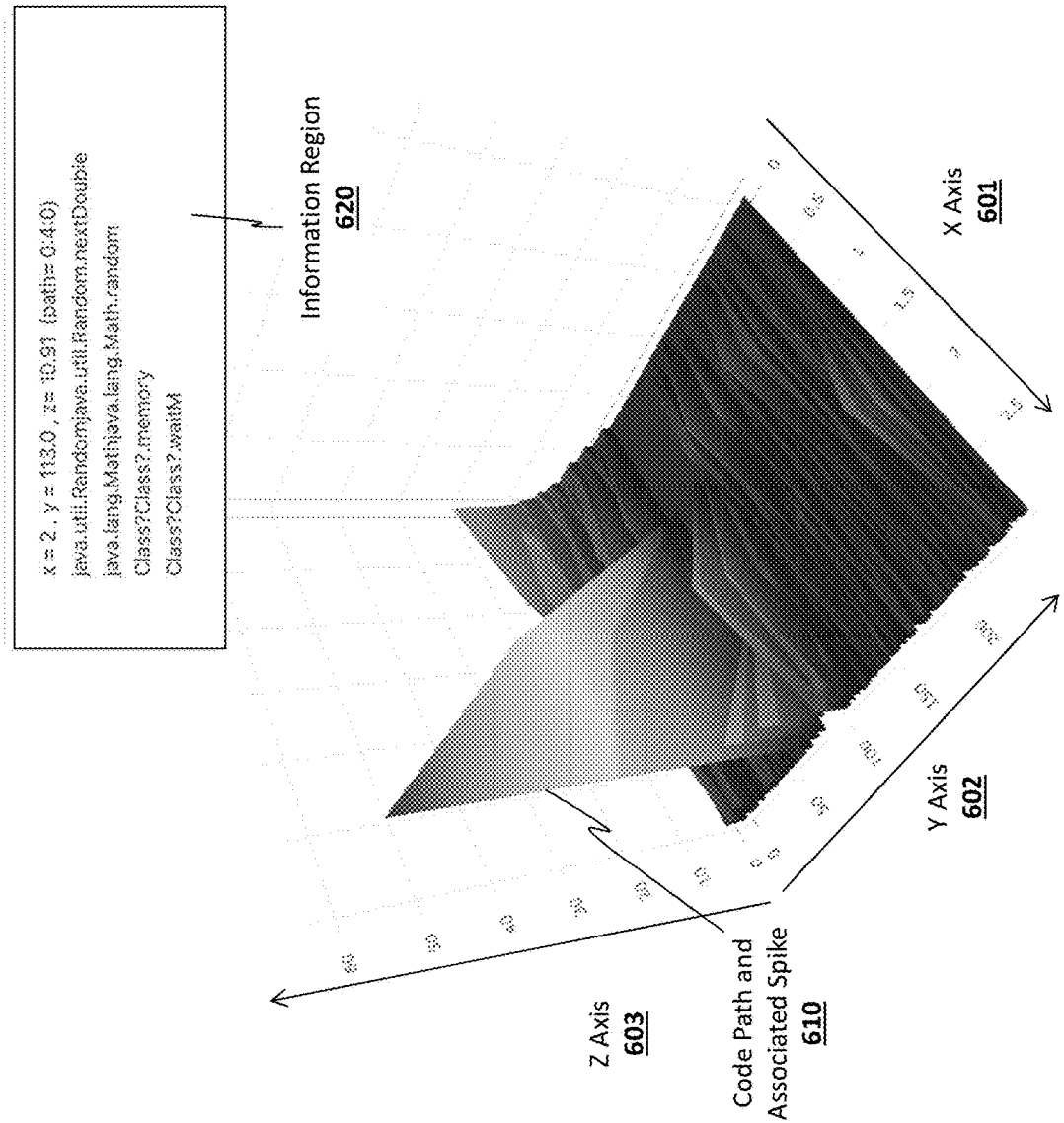

FIGS. 6A-B illustrates one particular implementation of the GUI 188 which provides a three-dimensional visualization of the relevant stack trace data. In this implementation, the X axis 601 represents time, the Y axis 602 represents each code path, and the Z axis 603 indicates the significance of the code path—i.e., the resource utilization of the code path, with higher values indicating greater resource utilization. The 3D representation provides an efficient way for a developer to locate the code paths which are contributing most significantly to the utilization of a given resource. In FIG. 6A, for example, a set of utilization spikes 600 are identified corresponding to a specific set of code paths, showing that at this particular window of time (starting at approximately t=12), this set of code paths are the primary consumers of the resource.

In the implementation in FIG. 6A, the combined resource utilization for all of the code paths is shown in the plane of the Z axis 603 (i.e., at Y=0), so that system-wide resource utilization spikes can be identified. The illustrated example includes a resource utilization spike (e.g., larger than Z=3.5 of the normalized range) at approximately t=2 (on the X axis 601) and another resource utilization spike at approximately t=17. Once identified, corresponding spikes in the individual code paths can easily be identified at the associated point in time to determine those code paths which are the biggest contributors.

Thus, the Z value associated with a particular code path at a particular point in time indicates the resource utilization of that code path at that point in time. In addition, in some implementations, color-coding is used to further differentiate the resource utilization of each code path. In FIG. 6A, for example, a color transition between blue (at Z=0) and red (at Z=3.5) may be used along the Z axis to further differentiate the various resource utilization values of the code paths. Various color-blending techniques may be used to adjust the code path colors based on the corresponding magnitude on the Z axis (e.g., proportionally blending a combination of the color for minimum Z with the color for maximum Z based on the location on the Z axis) to differentiate between the utilization of the code paths based on color.

In one implementation, individual code paths may be selected from within the visual representation to retrieve information associated with the selected code path and display the retrieved information within the GUI. Selection of a particular code path at a particular point in time may be accomplished via a mouse, specific keys or key combinations on a keyboard, touch screen, or any other cursor control or user selection mechanism.

FIG. 6B illustrates one particular implementation in which the code path at Y=113 is selected at time X=2, causing an information region 620 to be displayed containing code path data for the selected code path at the selected time. Any information related to the selected code path may be displayed in the information region 620 including, but not limited to, the set of active functions in the code path, the current resource utilization of the code path, and memory allocations associated with the code path. FIG. 6B illustrates a different set of code paths than FIG. 6A, including a different resource utilization spike 610 associated with one of the code paths. In addition to its height on the Z axis, color-coding may be used as described above to differentiate the code path from all others (e.g., based on its red peak). For example, the bottom region of the code path may be one color (e.g., blue), while portions of the code path above a threshold Z value (e.g., Z=15, 25, etc) may be a different color (e.g., red).

Figure 7A:
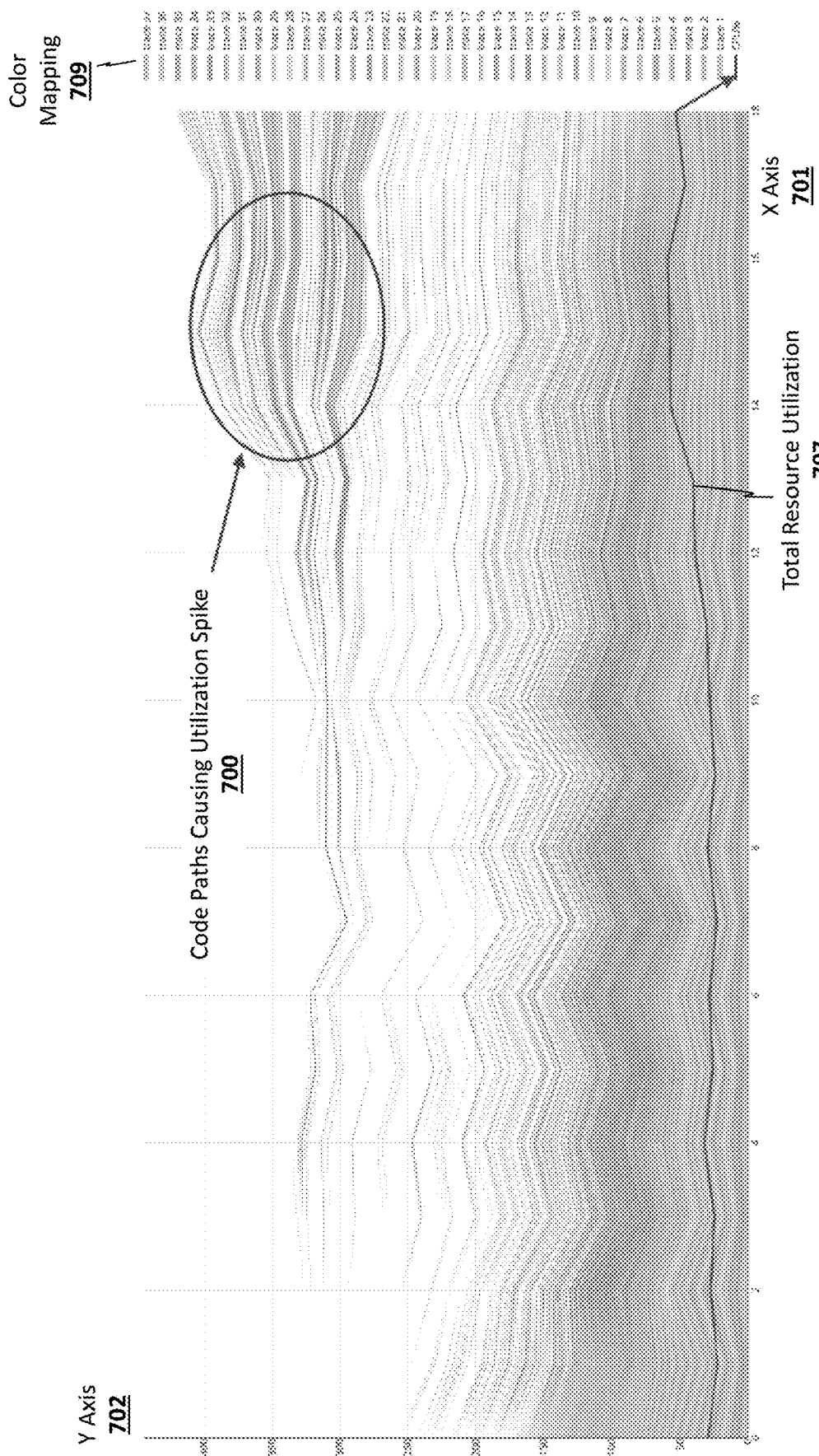
FIGS. 7A-B illustrate another implementation of a graphical user interface for visualizing code paths with a time dimension.

FIG. 7A illustrates another implementation for visualizing code paths and identifying the code paths which are the most significant contributors to resource utilization, including resource utilization spikes. In this implementation, the X axis 701 represents time and the Y axis 702 shows different code paths in the form of lines or "rivers" with widths indicating the extent of contribution to the resource utilization. For example, the rivers for a particular set of code paths 700 widen in a certain period of time (between approximately t=12 and t=17), indicating that these code paths are primarily responsible for the corresponding resource utilization spike. A separate curve is generated to indicate total resource utilization 707 of the combined code paths, indicating that resource utilization reaches a maximum within the same time period.

Figure 7B:
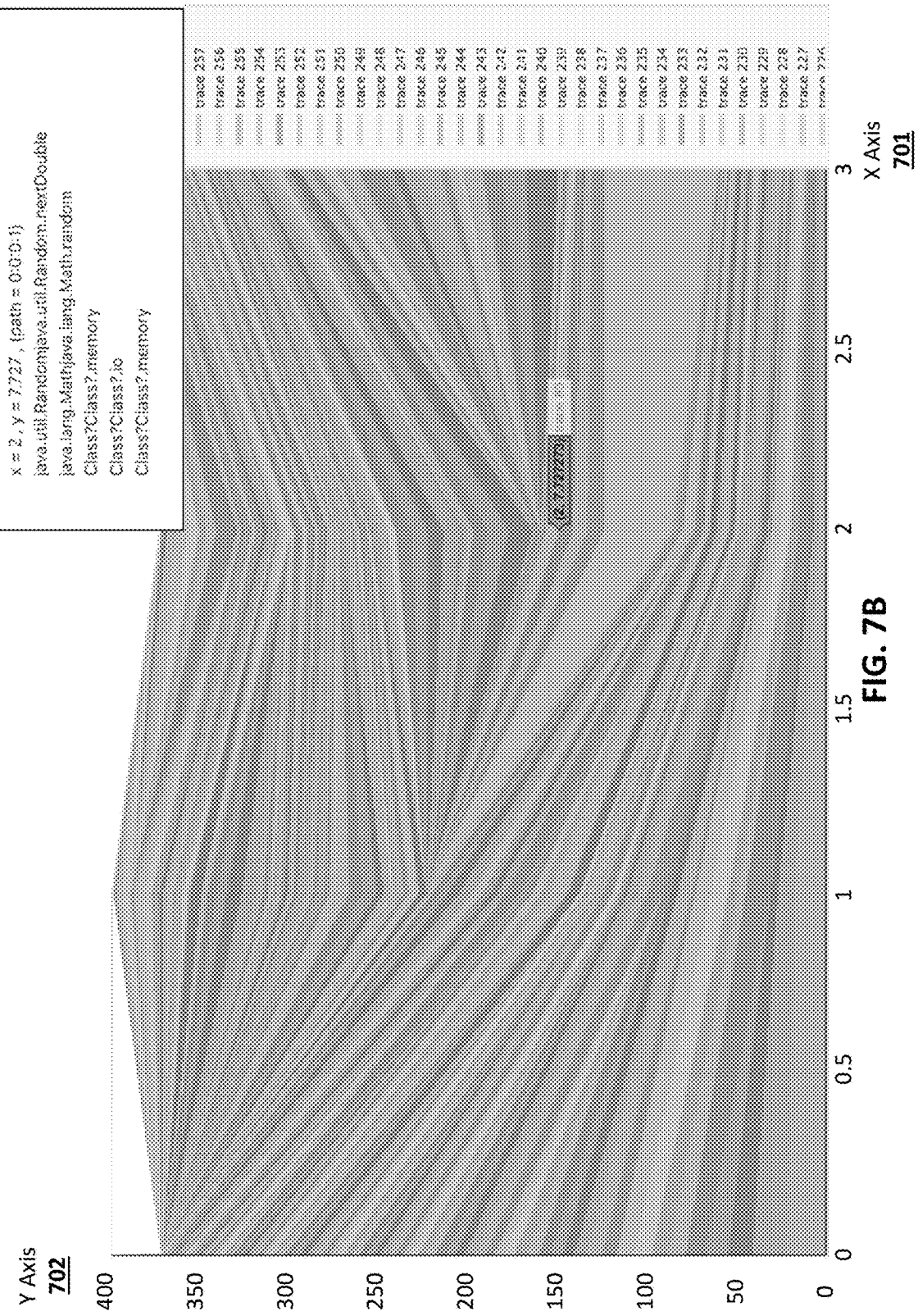

As with the 3D visual representation shown in FIGS. 6A-B, individual code paths may be selected from within the visual representation to cause information associated with the selected code path to be displayed. FIG. 7B, for example, illustrates one particular implementation in which the code path at Y=7.727 ("trace 85" in the example) is selected at time X=2, causing an information region 720 to be displayed containing code path data for the selected code path at the selected time. As mentioned, any information related to the selected code path may be included in the information region 720.

Color-coding is also used in this implementation to visually differentiate between code paths in the graph. In one implementation, a rotating sequence of easily distinguished colors are assigned sequentially to the code paths in the graph (e.g., 10 different colors in the example). Once the final color in the color sequence has been assigned to a code path, the color sequence is repeated sequentially for the next sequence of code paths, thereby ensuring that the individual code paths can be easily differentiated and selected within the visual representation. In one implementation, the mapping of colors to code paths (labeled with a trace number in FIGS. 7A-B) is shown in a pane 709, adjacent to the graph.

Different selection options may be provided upon selection of a particular code path from any of the visualizations described herein. For example, in response to one type of selection (e.g., a mouse left click or a particular keyboard combination) information is provided in an information region 620, 720 as described above. In response to a different type of selection (e.g., a mouse right click or a different keyboard key or key combination) a set of options may be provided via a drop-down menu and/or additional actions may automatically be performed. For example, one implementation provides a tree view of the code path or other navigational arrangement within which individual function calls and related data can be selected for drilling down further into the code path. Some implementations provide a flame graph view related to the code path, showing the code path using a hierarchical arrangement of functions, including the relationships with other code paths. Various other views may be provided in response to selection of the code path in the visual representation and input via the cursor control device or keyboard.

The various graphical visualizations described herein may be generated based on the aligned and normalized data 225 generated by the multi-dimensional data mapper and/or the code path search tree 195 (which, as mentioned, may be updated with the aligned and normalized data 225). Thus, in this implementation, the GUI 188 accesses normalized code path data (e.g., within a defined range) which has been aligned in time to the corresponding resource utilization data 155. Note, however, that the code path visualization techniques described herein are not limited to this specific type of data. For example, in some implementations, the GUI 188 may parse and organize unprocessed code path data and resource utilization data to render the code path visualizations described herein.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 8B:
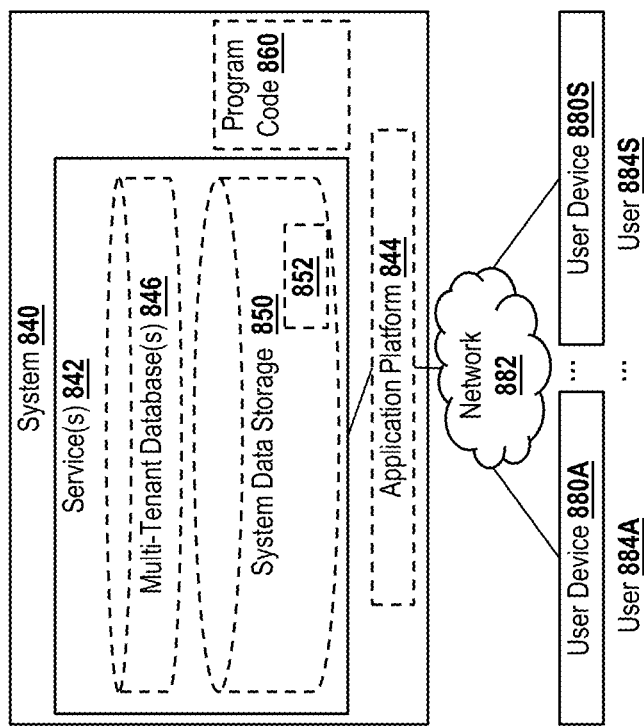
FIG. 8B is a block diagram of a deployment environment according to some example implementations.
Figure 8A:
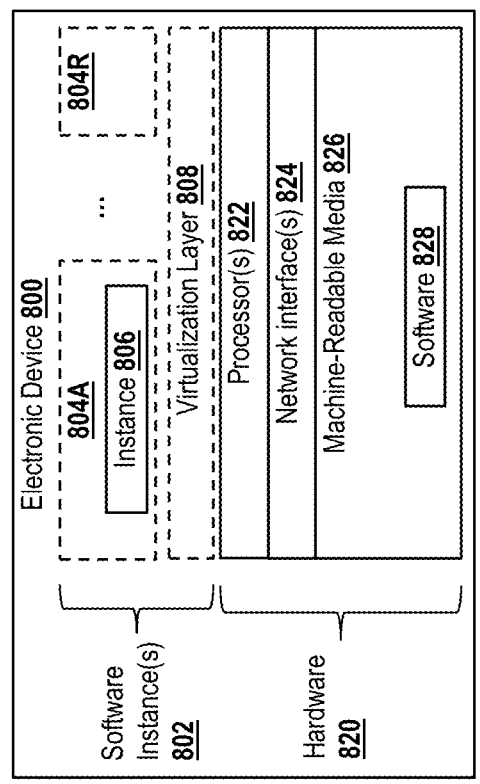
FIG. 8A is a block diagram illustrating an electronic device 1800 according to some example implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and machine-readable media 826 having stored therein software 828 (which includes instructions executable by the set of one or more processor(s) 822). The machine-readable media 826 may include non-transitory and/or transitory machine-readable media. Each of the previously described components including the code path tree generator 190, the multi-dimensional data mapper 180, and the contributing code path ranking logic 184, and the GUI 188 may be implemented in one or more electronic devices 800. In one implementation: 1) the GUI 188 is implemented in a separate one of the electronic devices 800 (e.g., in an user device where the software 828 represents the software to implement clients to interface directly and/or indirectly with the other components (e.g., software 828 represents a web browser, a native client, a portal, a command-line interface, and/or an application programming interface (API) based upon protocols such as Simple Object Access Protocol (SOAP), Representational State Transfer (REST), etc.)); 2) the code path three generator 190, multi-dimensional data mapper 180, and contributing code path ranking logic 184 are implemented in a separate set of one or more of the electronic devices 800 (e.g., a set of one or more server devices where the software 828 represents the software to implement a server which provides the recited functions of these components); and 3) in operation, the electronic devices implementing the clients and servers would be communicatively coupled (e.g., by a network) and would establish between them (or through one or more other layers and/or or other services) connections for exchanging messages and data. Other configurations of electronic devices may be used in other implementations (e.g., an implementation in which the client, the code path three generator 190, the multi-dimensional data mapper 180, and the contributing code path ranking logic 184 are implemented on a single electronic device 800).

During operation, an instance of the software 828 (illustrated as instance 806 and referred to as a software instance; and in the more specific case of an application, as an application instance) is executed. In electronic devices that use compute virtualization, the set of one or more processor(s) 822 typically execute software to instantiate a virtualization layer 808 and one or more software container(s) 804A-804R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-804R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 828 is executed within the software container 804A on the virtualization layer 808. In electronic devices where compute virtualization is not used, the instance 806 on top of a host operating system is executed on the "bare metal" electronic device 800. The instantiation of the instance 806, as well as the virtualization layer 808 and software containers 804A-804R if implemented, are collectively referred to as software instance(s) 802.

Alternative implementations of an electronic device may have numerous variations from that described above. For example, customized hardware and/or accelerators might also be used in an electronic device.

Example Environment

FIG. 8B is a block diagram of a deployment environment according to some example implementations. A system 840 includes hardware (e.g., a set of one or more server devices) and software to provide service(s) 842, including the pricing service. In some implementations the system 840 is in one or more datacenter(s). These datacenter(s) may be: 1) first party datacenter(s), which are datacenter(s) owned and/or operated by the same entity that provides and/or operates some or all of the software that provides the service(s) 842; and/or 2) third-party datacenter(s), which are datacenter(s) owned and/or operated by one or more different entities than the entity that provides the service(s) 842 (e.g., the different entities may host some or all of the software provided and/or operated by the entity that provides the service(s) 842). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 840 is coupled to user devices 880A-880S over a network 882. The service(s) 842 may be on-demand services that are made available to one or more of the users 884A-884S working for one or more entities other than the entity which owns and/or operates the on-demand services (those users sometimes referred to as outside users) so that those entities need not be concerned with building and/or maintaining a system, but instead may make use of the service(s) 842 when needed (e.g., when needed by the users 884A-884S). The service(s) 842 may communicate with each other and/or with one or more of the user devices 880A-880S via one or more APIs (e.g., a REST API). In some implementations, the user devices 880A-880S are operated by users 884A-884S, and each may be operated as a client device and/or a server device. In some implementations, one or more of the user devices 880A-880S are separate ones of the electronic device 800 or include one or more features of the electronic device 800.

In some implementations, the system 840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 840 is a multi-tenant cloud computing architecture supporting multiple services, such as one or more of the following types of services: Pricing; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Cache-as-a-Service (CaaS); Analytics; Community; Internet-of-Things (IoT); Industry-specific; Artificial intelligence (AI); Application marketplace ("app store"); Data modeling; Security; and Identity and access management (JAM).

For example, system 840 may include an application platform 844 that enables PAAS for creating, managing, and executing one or more applications developed by the provider of the application platform 844, users accessing the system 840 via one or more of user devices 880A-880S, or third-party application developers accessing the system 840 via one or more of user devices 880A-880S.

In some implementations, one or more of the service(s) 842 may use one or more multi-tenant databases 846, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user devices 880A-880S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the multi-tenant database(s) 846 and/or system data storage 850.

In some implementations, the service(s) 842 are implemented using virtual applications dynamically created at run time responsive to queries from the user devices 880A-880S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. In some implementations, the program code 860 may form at least a portion of the code path tree generator 190, the multi-dimensional data mapper 180, and/or the contributing code path ranking logic 184. Further, in one implementation, the application platform 844 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 840 and the user devices 880A-880S.

Each user device 880A-880S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, and to perform searches on stored data, and otherwise allow one or more of users 884A-884S to interact with various GUI pages that may be presented to the one or more of users 884A-884S. User devices 880A-880S might communicate with system 840 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 880A-880S might include an HTTP client, commonly referred to as a "browser," for sending and receiving HTTP messages to and from server(s) of system 840, thus allowing users 884A-884S of the user devices 880A-880S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. For example, while specific types of search trees are described above, various other types of data structures may be constructed to reduce the size and manageability of stack trace data and/or profiling data. In addition, while some implementations are described above in the context of CPU utilization, the underlying principles of the invention can be applied to any metric associated with computing and networking architectures including, but not limited to, network bandwidth utilization, memory bandwidth utilization, memory storage utilization, and I/O bandwidth utilization.

What is claimed is:

1. An article of manufacture comprising a non-transitory machine-readable storage medium that provides instructions that, if executed by an electronic device, are configurable to cause the electronic device to perform operations comprising:
   reading code path data samples related to code paths of an application, container, or virtual machine (VM), each code path data sample including temporal data;
   rendering an interactive graphical user interface (GUI) including a first plurality of graphical elements that are of a first type of graphical element and that represent respective ones of a plurality of the code paths,
   wherein the first plurality of graphical elements are visually arranged in a Y axis and extend through an X axis that indicates a period of time, and wherein each of the first plurality of graphical elements includes a visual characteristic which changes as the each graphical element extends through the X axis to indicate resource utilization changes for the respective code path over the period of time based on the code path data samples, wherein the visual characteristic comprises visually extending the each graphical element in a Z axis associated with resource utilization, wherein the GUI includes a second type of graphical element representing system-wide resource utilization based on other data samples from a second source that tracks system-wide utilization of a resource, wherein the second type of graphical element changes as it extends through the X axis to indicate changes in the system-wide utilization of the resource over the period of time, wherein, when the second type of graphical element reflects a spike in the system-wide utilization of the resource at a point in time within the period of time, corresponding changes in different ones of the first plurality of graphical elements at the point in time reflect code paths of the plurality of the code paths that are greater contributors to the spike in the system-wide resource utilization, and whereby a user identifies a time within the period of time of any system-wide resource utilization spike based on the second type of graphical element, and then identifies a subset of the first plurality of graphical elements that indicate more resource utilization at the time as compared to others of the first plurality of graphical elements, and then identifies the respective ones of the plurality of the code paths represented by the subset of the first plurality of graphical elements.

2. The article of manufacture of claim 1 wherein the non-transitory machine-readable storage medium provides instructions that, if executed by the electronic device, are configurable to cause the electronic device to perform additional operations comprising:

performing one or more actions in response to selection of a graphical element of the first plurality of graphical elements via a user input device, the one or more actions including displaying additional data related to a code path of the plurality of the code paths corresponding to the graphical element of the first plurality of graphical element.

3. The article of manufacture of claim 2 wherein the non-transitory machine-readable storage medium provides instructions that, if executed by the electronic device, are configurable to cause the electronic device to perform additional operations comprising:

reading data from a subset of the code path data samples corresponding to the code path in response to the selection of the graphical element of the first plurality of graphical element; and presenting the data in a textual or graphical format within the GUI.

4. The article of manufacture of claim 3 wherein the reading data includes reading at least a portion of the temporal data associated with the code path, the portion of the temporal data associated with a selected region of the graphical element of the first plurality of graphical element.

5. The article of manufacture of claim 1 wherein the first plurality of graphical elements are visually arranged sequentially in the Y axis.

6. The article of manufacture of claim 1 wherein the visual characteristic comprises changes to a color associated with the each graphical element to indicate the resource utilization.

7. The article of manufacture of claim 2 wherein the one or more actions include displaying the code path within a tree or other hierarchical representation indicating relationships of function calls within the code path or relationships between the code path and one or more others of the plurality of the code paths.

8. The article of manufacture of claim 2 wherein the one or more actions include displaying the code path or portions thereof within a flame graph view, the flame graph view representing a plurality of function calls associated with the code path using a sequence of color-coded horizontal bars.

9. The article of manufacture of claim 1 wherein the code path data samples are stack traces, and wherein the second source is CPU performance monitoring counters.

10. The article of manufacture of claim 1 wherein the non-transitory machine-readable storage medium provides instructions that, if executed by the electronic device, are configurable to cause the electronic device to perform additional operations comprising:

causing a remediation action that includes throttling the resource utilization by the code paths of the plurality of code paths that are greater contributors to the spike in the system-wide resource utilization.

11. The article of manufacture of claim 1 wherein the non-transitory machine-readable storage medium provides instructions that, if executed by the electronic device, are configurable to cause the electronic device to perform additional operations comprising:

causing a remediation action that includes notifying a team or other entity responsible for designing and maintaining program code of the code paths of the plurality of code paths that are greater contributors to the spike in the system-wide resource utilization.

12. The article of manufacture of claim 1 wherein the plurality of the code paths includes more than 100 of the code paths.

13. A method comprising:

reading code path data samples related to a plurality of code paths of an application, container, or virtual machine (VM), each code path data sample including temporal data;

rendering an interactive graphical user interface (GUI) including a first plurality of graphical elements that are of a first type of graphical element and that represent respective ones of a plurality of the code paths, wherein the first plurality of graphical elements are visually arranged in a Y axis and extend through an X axis that indicates a period of time, and wherein each of the first plurality of graphical elements includes a visual characteristic which changes as the each graphical element extends through the X axis to indicate resource utilization changes for the respective code path over the period of time based on the code path data samples, wherein the visual characteristic comprises visually extending the each graphical element in a Z axis associated with resource utilization, wherein the GUI includes a second type of graphical element representing system-wide resource utilization based on other data samples from a second source that tracks system-wide utilization of a resource, wherein the second type of graphical element changes as it extends through the X axis to indicate changes in the system-wide utilization of the resource over the period of time, wherein, when the second type of graphical element reflects a spike in the system-wide utilization of the resource at a point in time within the period of time, corresponding changes in different ones of the first plurality of graphical elements at the point in time reflect code paths of the plurality of the code paths that are greater contributors to the spike in the system-wide resource utilization, and whereby a user may identifies a time within the period of time of any system-wide resource utilization spike based on the second type of graphical element, and then identifies a subset of the first plurality of graphical elements that indicate more resource utilization at the time as compared to others of the first plurality of graphical elements, and then identifies the respective ones of the plurality of the code paths represented by the subset of the first plurality of graphical elements.

14. The method of claim 13 further comprising:

performing one or more actions in response to selection of a graphical element of the first plurality of graphical elements via a user input device, the one or more actions including displaying additional data related to a code path of the plurality of the code paths corresponding to the graphical element of the first plurality of graphical element.

15. The method of claim 14 further comprising:

reading data from a subset of the code path data samples corresponding to the code path in response to the selection of the graphical element of the first plurality of graphical element; and presenting the data in a textual or graphical format within the GUI.

16. The method of claim 15 wherein the reading data includes reading at least a portion of the temporal data associated with the code path, the portion of the temporal data associated with a selected region of the graphical element of the first plurality of graphical element.

17. The method of claim 13 wherein the first plurality of graphical elements are visually arranged sequentially in the Y axis.

18. The method of claim 13 wherein the visual characteristic comprises changes to a color associated with the each graphical element to indicate the resource utilization.

19. The method of claim 14 wherein the one or more actions include displaying the code path within a tree or other hierarchical representation indicating relationships of function calls within the code path or relationships between the code path and one or more others of the plurality of the code paths.

20. The method of claim 14 wherein the one or more actions include displaying the code path or portions thereof within a flame graph view, the flame graph view representing a plurality of function calls associated with the code path using a sequence of color-coded horizontal bars.

21. The method of claim 13 wherein the code path data samples are stack traces, and wherein the second source is CPU performance monitoring counters.

22. The method of claim 13 further comprising:

causing a remediation action that includes throttling the resource utilization by the code paths of the plurality of code paths that are greater contributors to the spike in the system-wide resource utilization.

23. The method of claim 13 further comprising:

causing a remediation action that includes notifying a team or other entity responsible for designing and maintaining program code of the code paths of the plurality of code paths that are greater contributors to the spike in the system-wide resource utilization.

24. The method of claim 13 wherein the plurality of the code paths includes more than 100 of the code paths.

* * * * *